United States Patent
Lei et al.

(10) Patent No.: US 8,369,210 B2
(45) Date of Patent: Feb. 5, 2013

(54) RETRY FOR TELEMATICS PACKET DATA CONNECTION FAILURES IN CDMA 1XRTT NETWORK

(75) Inventors: Yao Hui Lei, Windsor (CA); Ki Hak Yi, Windsor (CA)

(73) Assignee: General Motors, LLC., Detroit, MI (US)

( * ) Notice: Subject to any disclaimer, the term of this patent is extended or adjusted under 35 U.S.C. 154(b) by 299 days.

(21) Appl. No.: 12/651,438

(22) Filed: Dec. 31, 2009

(65) Prior Publication Data

US 2011/0158084 A1 Jun. 30, 2011

(51) Int. Cl.
*H04L 1/00* (2006.01)
(52) U.S. Cl. .......................................... 370/218
(58) Field of Classification Search .......... 370/216–218, 370/221, 225, 320, 328–339, 342, 441
See application file for complete search history.

(56) References Cited

U.S. PATENT DOCUMENTS

| | | | | |
|---|---|---|---|---|
| 6,990,349 | B1* | 1/2006 | Idrissi | 455/450 |
| 7,171,226 | B2* | 1/2007 | Crocker et al. | 455/510 |
| 7,254,398 | B2* | 8/2007 | Patenaude | 455/450 |
| 2011/0130905 | A1* | 6/2011 | Mayer | 701/22 |

* cited by examiner

*Primary Examiner* — Frank Duong

(57) ABSTRACT

A technique and system are provided for executing retry procedures to resolve a packet connection failure during a CDMA 1xRTT packet session. In particular, the DTE is configured and controlled to retry based on either failure signals from the NAD or the Application Service Timer. Moreover, in one aspect, the DIE is configured and controlled to retry the packet connection selectively for traffic channel assignment failure, PPP connection failure, TCP/IP connection failure and Application service failure. In this way, the end user will experience a shorter service delivery time for packet-based telematics services.

20 Claims, 5 Drawing Sheets

RETRY FOR TELEMATICS PACKET DATA CONNECTION FAILURES IN CDMA 1XRTT NETWORK

BACKGROUND OF THE INVENTION

Many vehicles are built to include, or are retrofitted to include, telematics functionality. This functionality enables a module within the vehicle to communicate wirelessly with remote entities of interest such as call centers, vehicle service providers, emergency responders, friends, family, and so on. While this functionality provides high levels of convenience and peace of mind to vehicle users, it is also occasionally susceptible to the disconnections and disruptions that affect other network communications. Such disruptions, while usually correctable, may result in a diminished user experience and impaired user satisfaction due to delay, lost data, and so on. Therefore, it is generally desirable to eliminate such disruptions or to ensure that reconnection occurs as quickly as possible.

Typically, telematics units communicate wirelessly via packets, i.e., via a packet data connection. One such connection type sometimes used is CDMA 1xRTT, which is also at times referred to as CDMA2000 1x since the CDMA 1xRTT protocol is a phase of CDMA2000, a proposed 3G service that conforms to the ITU IMT-2000 standard for UMTS (Universal Mobile Telecommunications System) services for delivering near-broadband data over a mobile network. The CDMA 1 XRTT protocol can be implemented via minor hardware and software modifications relative to existing CDMA infrastructures.

As a packet-based extension to CDMA networks, CDMA 1xRTT can theoretically support data rates as high as 153 kbit/s. However, in practical implementations, the maximum data rate may vary, and may be as low as 9.6 kbit/s. Thus, the need for minimizing interruptions and delay due to disconnection is still present.

A substantial portion of the delay inherent in the use of CDMA 1xRTT and other technologies such as CDMA 1xEVDO can be traced to the retry mechanism used therein. In particular, upon detection of disconnection, current retry schemes within this protocol are designed to retry the packet connection in the following failure modes: Traffic channel assignment failure, PPP connection failure, and TCP/IP connection failure. This presents two limitations in the conventional tethered mode packet call between the DTE (TCU) and the ME (NAD) up to the DCE (Network). In particular, the DTE may not have knowledge of prior failure modes due to either lack of failure signals from the ME or simple implementation of the application timer. Moreover, the failure modes may be from any layer while establishing the packet session. The tethered mode architecture cannot support retries selectively for both failure modes on the protocol layers and failure modes on the application layer. This exacerbates the problems and user dissatisfaction caused by disconnection, in that reconnection may be delayed or even precluded.

BRIEF SUMMARY OF THE INVENTION

The invention provides an improved system, method, and mechanism for executing retry procedures to resolve the noted packet data failure issues in the CDMA 1xRTT network. In particular, while current schemes retry the packet connection in the Traffic channel assignment failure, PPP connection failure, and TCP/IP connection failure modes, the present invention cures the noted limitations by configuring and controlling the DTE to retry based on either failure signals from the ME or the Application Service Timer timeout. Moreover, in one aspect, the DTE is configured and controlled to retry the packet connection selectively for traffic channel assignment failure, PPP connection failure, TCP/IP connection failure and Application service failure.

In this way, the end user will experience fewer failures and will be provided with a shorter service delivery time for packet-based telematics services. Not only does this increase user satisfaction due to the elimination of delay, but it also reduces the overall over-the-air cost by eliminating call fall-back connections in different call types. With respect to the service provider, the disclosed technique provides the opportunity to lower the telematics call-center costs accordingly as well.

It will be appreciated that other examples of the invention provide for a system and a computer-readable medium having thereon computer-executable instructions for carrying out this and other methods in keeping with the described principles. In this context, the term computer-readable media includes such physical media as discs, drives, memory, and so on, whether optical, magnetic, solid state, etc. The term computer-executable instructions refers to program code or other instructions that can be read and executed by a computing device, i.e., a device having a processor for executing such instructions.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In overview, not intended to limit the claims, the invention provides a system and method for improving the end user experience for users of telematics devices implementing the CDMA 1xRTT network protocol. In particular, instead of executing retry procedures in a traditional way that can incur substantial delay penalties, the described system shortens service delivery time for packet-based telematics services and reduces the over-the-air costs by eliminating call fall-back connections in different call types by configuring and controlling the DTE to retry based on either failure signals from the ME or the Application Service Timer timeout. The DTE may be additionally configured and controlled to retry the packet connection selectively for traffic channel assignment failure, PPP connection failure, TCP/IP connection failure and Application service failure, thus reducing the delay experienced upon reconnection after a disconnect.

Figure 1:
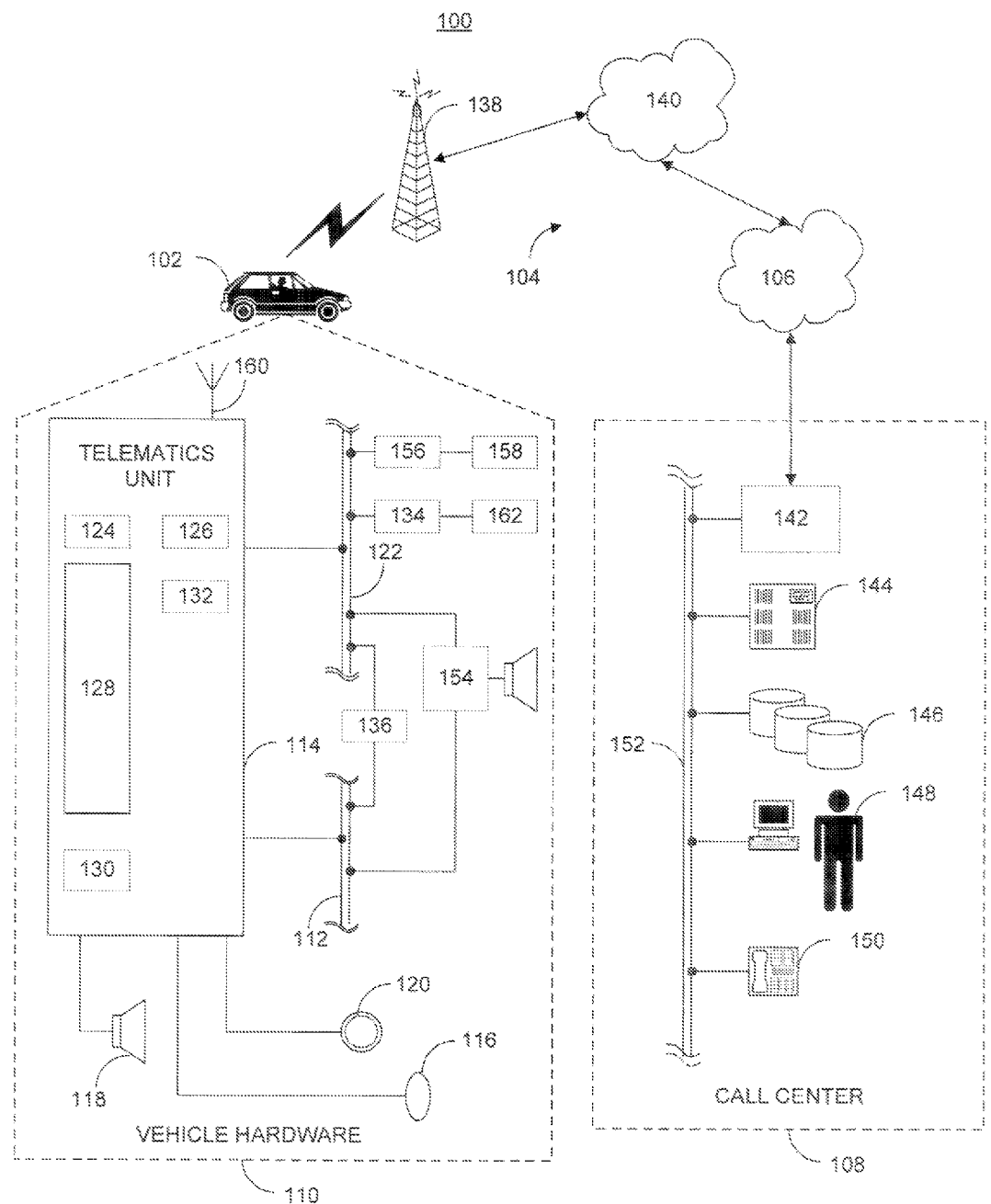
FIG. 1 is a schematic illustration of an exemplary vehicle, telematics unit, and network environment within which the disclosed principles may be beneficially implemented.

An exemplary environment in which this invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a UPS chipset/component 132. Note that dual antenna 160 includes multiband functionality in an implementation. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle; and Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 may include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well. The wireless carrier system 104 also contains a base station controller (BSC) or radio network controller (RNC) and packet control function (PCF) which tracks, for example, registration lifetime expiration. Additional wireless carrier components include packet data service node/foreign agent functionality which provides a packet data path from the cell tower 138 and BSC/RNC through the PCF toward the wireless carrier system 104.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, the telematics unit 114 is an onboard device that provides a communication function via a cellular chipset/component 124 and a wireless modem 126 which obtain wireless access via a dual antenna 160. The cellular chipset/component 124 and wireless modem 126 are also referred to as the NAD (180), and the wireless modem 126 includes a computer program and/or set of software routines executing within processing device 128. The routines and techniques described herein with respect to retry functionality may be executed by the NAD 180 or may be executed within another component of the system depending upon implementation preferences.

As telematics unit 114 communicates wirelessly via packets over CDMA 1xRTT, there may be disconnections, i.e., a loss of communication during a packet session. After such an occurrence, the telematics unit 114 will retry the connection, i.e., it will try to reestablish the lost session or lost connectivity. However, there are a number of points in the communications (packet session) pipeline that the session can fail, and thus, retrying is sometimes a time-consuming endeavor. In current systems, for example, upon detection of disconnection, the system retries the packet connection by first assuming a traffic channel assignment failure, then a PPP connection failure, and then a TCP/IP connection failure.

However, systems configured to behave in this way fall prey to two substantial limitations in the conventional tethered mode packet call between the DIE and the NAD, up to the network DCE. In particular, the DTE may not have knowledge of prior failure modes due to a lack of failure signals as well as other reasons. Moreover, the failure modes may be from any layer, but the tethered mode architecture cannot selectively provide retries for failure modes on the protocol layers and failure modes on the application layer.

The principles described herein eliminate the noted limitations by configuring and controlling the DTE to execute retries based on failure signals from either the NAD or the Application Service Timer timeout. Moreover, in one aspect, the DIE is configured and controlled to retry the packet connection selectively for traffic channel assignment failure, PPP connection failure, TCP/IP connection failure and Application service failure.

Figure 2:
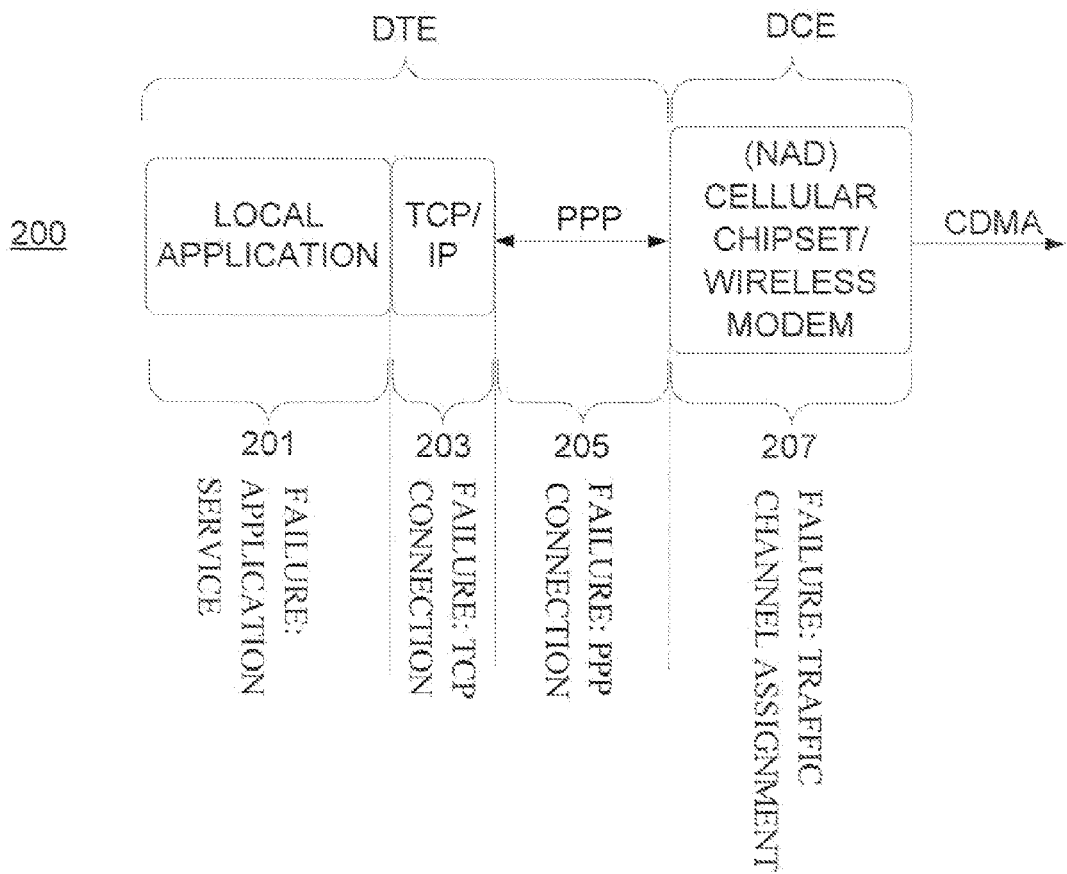
FIG. 2 is a communications link architecture diagram showing potential failure points remediable by aspects of the disclosed principles.

Turning to further specific details regarding the invention, FIG. 2 is a schematic system diagram showing the DIE and DCE aspects of the system and related failure modes. In particular, the architecture of the mobile device (telematics unit or TCU) communications channel includes several components including a local application 201, a TCP/IP processing module or function 203, and a cellular chipset/wireless modem 207, herein also referred to as the network access device or NAD. The TCU supports a PPP channel or layer 205 for communicating TCP/IP data to the NAD 207. It will be appreciated that local application 201 may or may not be a user-driven application and may or may not provide a user interface. For example, the application 201 may be an autonomous application.

Each segment of the communications chain 200 may experience a temporary failure for any of a number of reasons. For example, the application 201 may cause or experience an application service failure, disrupting an ongoing communications event or session. Similarly, the TCP/IP module 203 may experience a TCP/IP connection failure, preventing application communications from reaching the PPP channel 205 and preventing incoming communications from reaching the application 201. The PPP channel 205 itself may fail with the same result, albeit for different reasons. Finally, the NAD 207 may fail, i.e., via a traffic channel assignment failure.

Any of these failure modes may completely block the passage of incoming and/or outgoing packets. Thus, it is important to identify the failure mode and retry the connection. As noted above, there are multiple failure modes including a traffic channel assignment failure, a PPP connection failure, a TCP/IP connection failure and an Application service failure. Thus, the method of retrying the connection will have a significant impact on the speed with which the connection is reestablished.

Figure 3:
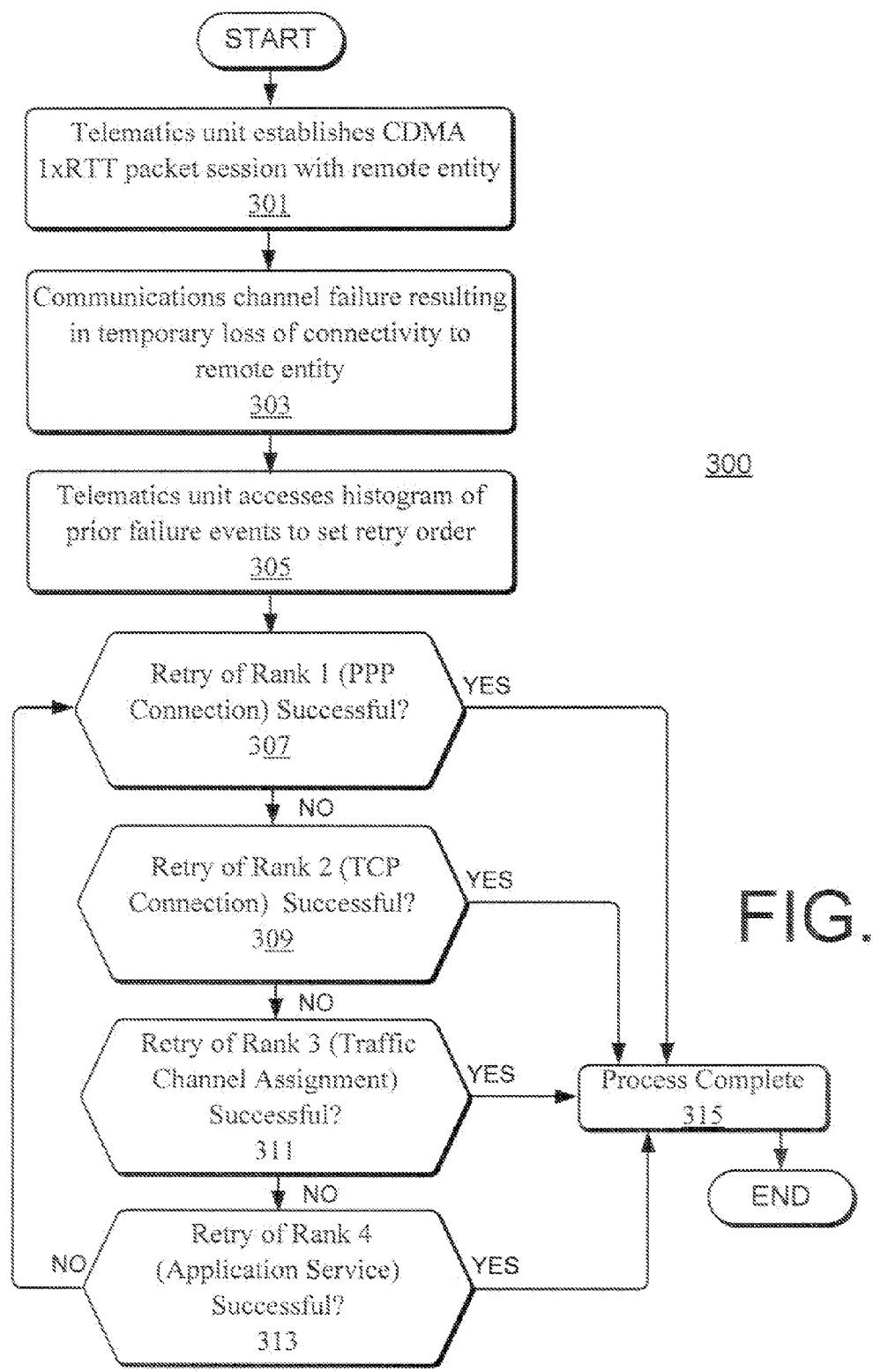
FIG. 3 is a flow chart showing a process of selectively retrying failed links according to an aspect of the disclosed principles.

An exemplary retry method is illustrated in FIG. 3, with respect to an unknown failure type, i.e., an unspecified one of the above mentioned failure modes. Upon commencement of the process 300 at stage 301, the telematics unit establishes a CDMA 1xRTT packet session with a remote entity, e.g., an application at the call center 108. Before the session is terminated by either the telematics unit 114 or the call center 108, the communications channel in the telematics unit 114 experiences a failure in stage 303 resulting in a temporary loss of connectivity to the call center 108. This may be detected by the application 201, when it observes missing packets or a cessation of incoming packets, including acknowledgments, etc.

In any event, continuing with the process 300 of FIG. 3, the telematics unit 114 commences the retry sequence at stage 305 by accessing a database storing data, e.g., a histogram, of prior failure modes, weighted by time elapsed since the event. For example, as time elapses after an occurrence of a failure, that failure is weighted a decreasing fractional amount proportional to the time elapsed. Thus, a failure that has just occurred may be essentially unweighted (e.g., 1.0), while a failure that occurred two minutes prior may be weighted by ½ (0.5) and a failure that occurred four minutes ago may be weighted by ¼ (0.25).

Figure 4:
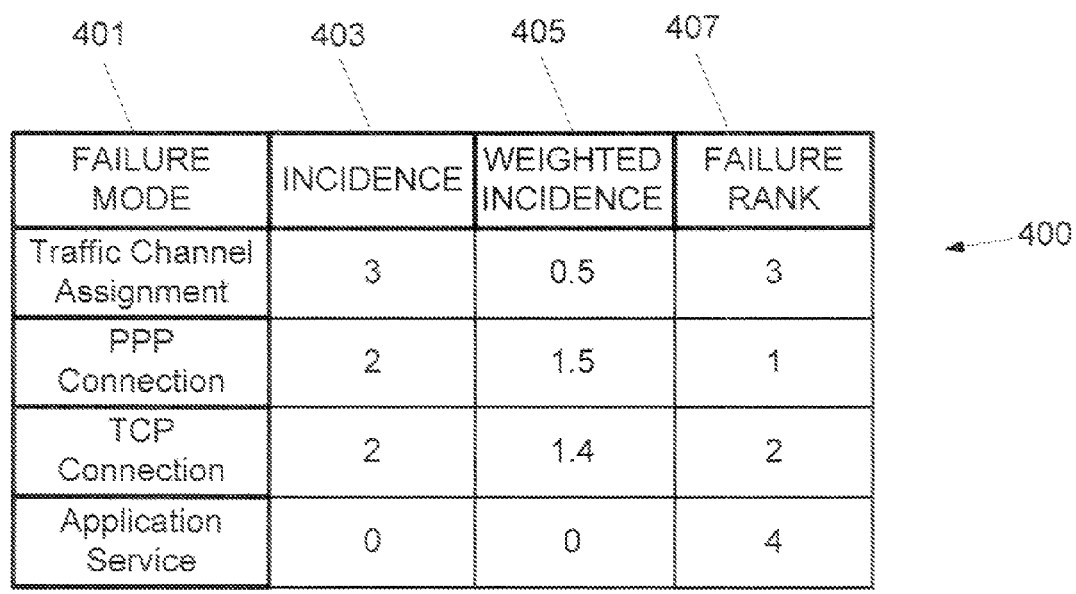
FIG. 4 is a data chart showing a histogram of prior failure data usable in an aspect of the disclosed system and method.

An example histogram 400 is shown in FIG. 4. The illustrated histogram 400 shows column fields for failure mode identity (401), raw failure incidence (403), weighted failure incidence (405), and resultant failure rank (407). For example, in the illustrated instance, field 405 of the histogram 400 shows that the time weighted incidence of the various failures is as follows:

Traffic Channel Assignment Failure—0.5
PPP Connection Failure—1.5
TCP/IP Connection Failure—1.4
Application Service Failure—0.

Given this historical information, the telematics unit 114 establishes a retry order in stage 307 designed to quickly locate the failed link by retrying the links in decreasing order of weighted incidence as determined by the histogram 400. In the illustrated situation, the retry order based on the weighted incidence is as follows, from 1 to 4:

PPP Connection Failure—1
TCP/IP Connection Failure—2
Traffic Channel Assignment Failure—3
Application Service Failure—4.

Thus, at stages 307-313 of the process 300, the telematics unit 114 retries the various links in the order indicated by the failure rank of the histogram 400. For the illustrated example then, this means that at stage 307 the telematics unit 114 retries the PPP connection. If a failed PPP connection was the source of the connection failure and the retry is successful, then the process 300 completes at stage 315. Otherwise, the process 300 continues to stage 309.

At stage 309, the telematics unit 114 retries the TCP/IP connection to determine if the packet connection can be reestablished in this manner. As with the PPP connection, if a failed TCP/IP connection was the source of the connection failure and the retry in stage 309 is successful, then the process 300 completes at stage 315. Otherwise, the process 300 continues to stage 311, where the telematics unit retries the third ranked failure mode, i.e., the Traffic Channel Assignment mechanism. If the retry of the Traffic Channel Assignment mechanism successfully reestablishes the packet connection, then the process 300 ends at stage 315. In the event that the retry of the Traffic Channel Assignment mechanism is not successful, then the process 300 continues to stage 313, to perform the last retry, i.e., that of the fourth ranked failure mode, the Application service.

As noted above, an aspect of the described system entails configuring and controlling the DTE to modify its retry behavior based on failure signals from one of the NAD and the Application Service Timer timeout. The Application Service Timer is set to wait for a certain action to occur, e.g., with respect to the CDMA 1xRTT packet session, an acknowledgement of a message or packet.

Figure 5:
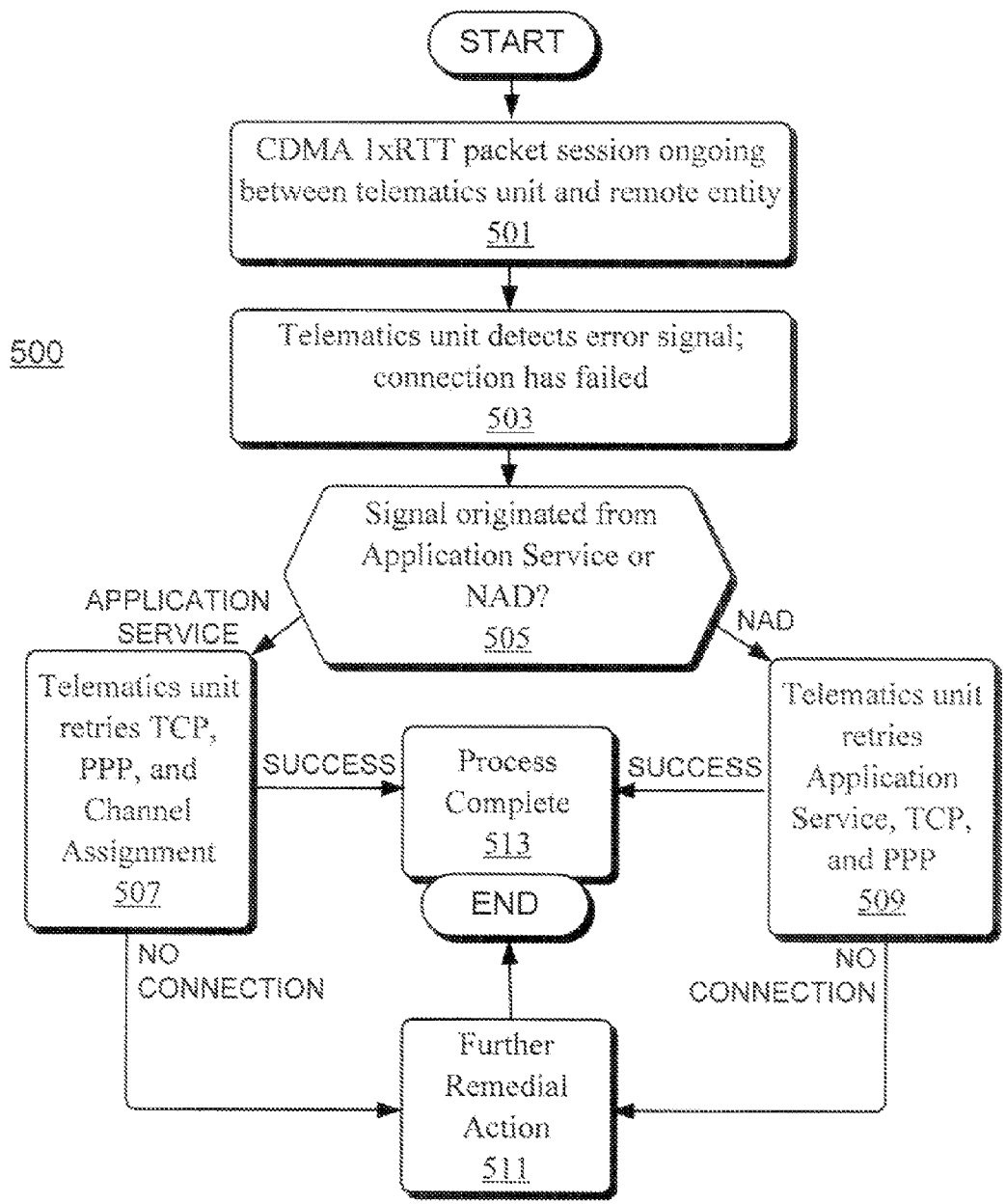
FIG. 5 is a flow chart showing a process for employing failure signal origination to more finely resolve retry efforts according to an aspect of the disclosed teachings.

This aspect of the system may be used in conjunction with the aspects described with respect to the process 300, but alternatively may be used in isolation. FIG. 5 illustrates a flowchart of a process 500 for executing retry functionality in keeping with this additional aspect. In particular, at stage 501 of the process 500, a CDMA 1xRTT packet session is ongoing between the telematics unit 114 and a remote entity such as call center 108. At some point during the session, represented at stage 503, the telematics unit 114 detects an error signal indicating that the connection has failed. The error signal received by the telematics unit 114 has originated from one of the Application Service Timer and the NAD. At stage 505, the telematics unit 114 determines which of these entities is responsible for the error message. This determination is then used to limit the choices for possible retry.

For example, if it is determined at stage 505 that the Application Service Timer originated the error message and that no error message was received from the NAD, then the process flows to stage 507, whereupon the telematics unit 114 retries the TCP/IP connection, the PPP connection, and the Channel Assignment. These alternatives are optionally retried in ranked order depending upon failure history as indicated with respect to FIGS. 3 and 4. If the connection is successfully reestablished, then the process 500 ends at stage 513.

If, on the other hand, it is determined at stage 505 that the error message was received from the NAD, then the process 500 flows to stage 509, whereupon the telematics unit 114 retries the Application Service, TCP/IP connection, and PPP connection. As in stage 507, these alternatives may be retried in ranked order depending upon failure history. If the connection is successfully reestablished, then the process 500 ends at stage 513.

If neither of stages 507 and 509 is successful in reestablishing the packet session, then the process 500 flows to stage 511. At stage 511, the process 500 executes further remedial action, including potentially reexecuting earlier stages, until the connection is successfully reestablished, before terminating at stage 513.

It will be appreciated that the foregoing methods and implementations for modified retry behavior for CDMA 1xRTT packet session reconnection are merely examples of the inventive principles, and that these illustrate only preferred techniques. It is contemplated that other implementations of the invention may differ in detail from the foregoing examples. As such, all mentions of the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of resolving a failed wireless broadband packet session between a telematics unit and a remote entity, the method comprising:
   establishing a wireless broadband packet session between the telematics unit and the remote entity, wherein the packet session utilizes a communications chain including multiple serial communications links;
   detecting at the telematics unit that the packet session has failed due to a failure of one of the multiple serial communications links;
   accessing a database containing prior failure incidences for each of the multiple serial communications links and determining respective ranks of the multiple serial communications links based on failure risk; and
   retrying each of the multiple serial communications links in order of the respective ranks to reestablish the packet session.

2. The method according to claim 1, wherein the wireless broadband packet sessions conforms to one of CDMA 1xRTT, CDMA 1xEVDO HRPD, GSM GPRS/EDGE, WCDMA/HSDPA, HSUPA.

3. The method according to claim 1, wherein the multiple serial communications links include an Application Service link, a TCP/IP link, a PPP link and a Data Channel Assignment link.

4. The method according to claim 1, wherein determining respective ranks of the multiple serial communications links based on failure risk comprises determining the respective ranks based on historical failure incidence for each of the multiple serial communications links.

5. The method according to claim 1 wherein the Application Service link is associated with an application local to the telematics unit.

6. The method according to claim 3, wherein determining the respective ranks based on historical failure incidence for each of the multiple serial communications links further comprises weighting the historical failure incidence.

7. The method according to claim 5, wherein weighting the historical failure incidence further comprises weighting historical failure incidence based on time elapsed for each historical failure event.

8. The method according to claim 1, wherein one of the multiple serial communications links provides access to a wireless network.

9. A method of reconnecting a failed CDMA 1xRTT packet session between a telematics unit and a remote entity, the method comprising:
   establishing a wireless CDMA 1xRTT packet session between the telematics unit and the remote entity, wherein the packet session utilizes multiple serial communications links including an application service, having an application service timer, and a network access device;
   detecting an error signal at the telematics unit, the error signal originating from one of the application service timer and the network address device, the error signal indicating that the packet session has failed due to a failure of one of the multiple serial communications links;
   determining whether the error signal originated from the application service timer or the network address device;
   establishing a retry sequence to retry selected ones of the multiple serial communications links based on the origin of the received error signal; and
   reestablishing the failed packet session.

10. The method according to claim 9, wherein the multiple serial communications links include an Application Service link, a TCP/IP link, a PPP link and a Data Channel Assignment link.

11. The method according to claim 10, wherein establishing a retry sequence to retry selected ones of the multiple serial communications links based on the origin of the received error signal further comprises establishing a retry sequence including the TCP/IP link, PPP link and Data Channel Assignment link if the error signal originated from the application service timer.

12. The method according to claim 10, wherein the received error signal comprises a timeout signal from the application service timer.

13. The method according to claim 10, wherein establishing a retry sequence to retry selected ones of the multiple serial communications links based on the origin of the received error signal further comprises establishing a retry sequence including the application service, TCP/IP link, and PPP link if the error signal originated from the network access device.

14. The method according to claim 10, wherein the Application Service link is associated with an application local to the telematics unit.

15. The method according to claim 9, wherein the network, access device provides access to a wireless network.

16. The method according to claim 9, wherein the remote entity is a remote call center.

17. A non-transitory computer readable medium having thereon computer executable instructions for resolving a failed CDMA 1xRTT packet session between a telematics unit and a remote entity, the computer executable instructions comprising:
   instructions for establishing a wireless CDMA 1xRTT packet session between the telematics unit and the remote entity, wherein the packet session utilizes a communications chain including multiple serial communications links;
   instructions for detecting at the telematics unit that the packet session has failed due to a failure of one of the multiple serial communications links;
   instructions for accessing a database containing prior failure incidences for each of the multiple serial communications links and determining respective ranks of the multiple serial communications links based on failure risk; and instructions for retrying each of the multiple serial communications links in order of the respective ranks to reestablish the packet session.

18. The non-transitory computer readable medium according to claim 17, wherein the multiple serial communications links include an Application Service link, a TCP/IP link, a PPP link and a Data Channel Assignment link.

19. The non-transitory computer readable medium according to claim 17, wherein the instructions for determining respective ranks of the multiple serial communications links based on failure risk comprise instructions for determining the respective ranks based on historical failure incidence for each of the multiple serial communications links.

20. The non-transitory computer readable medium according to claim 17, wherein the instructions for determining the respective ranks based on historical failure incidence for each of the multiple serial communications links further comprise instructions for weighting historical failure events based on time elapsed since each historical failure event.

\* \* \* \* \*